United States Patent [19]
Gutierrez

[11] Patent Number: 6,014,000
[45] Date of Patent: Jan. 11, 2000

[54] SYSTEM WITH MOTOR CONTROL USING MULTIPLE TIMING SIGNAL GENERATORS

[75] Inventor: Hernan I. Gutierrez, Guadalajara Jalisco, Mexico

[73] Assignee: Hewlett-Packard Company, Palo Alto, Calif.

[21] Appl. No.: 09/182,836

[22] Filed: Oct. 28, 1998

[51] Int. Cl.[7] .................................................. H02P 8/00
[52] U.S. Cl. ............................ 318/696; 318/254; 318/562
[58] Field of Search ..................................... 318/254, 696, 318/562, 102, 685

[56] References Cited

U.S. PATENT DOCUMENTS

| | | |
|---|---|---|
| 3,644,812 | 2/1972 | Bitto et al. ............................... 318/254 |
| 4,055,786 | 10/1977 | DiMarzio ................................. 318/562 |
| 4,369,402 | 1/1983 | Gabor et al. ............................. 318/685 |
| 4,469,995 | 9/1984 | Chiang et al. ........................... 318/685 |
| 4,518,900 | 5/1985 | Nawata .................................... 318/102 |
| 4,859,923 | 8/1989 | Malka et al. ............................. 318/685 |

*Primary Examiner*—Robert E. Nappi
*Assistant Examiner*—Rita Leykin

[57] ABSTRACT

A system with motor control uses multiple timing signal generators to control a stepper motor. Control is based on a first timing signal generator when changing the motor's angular velocity. Control is based on a second timing signal generator when the motor's angular velocity is to be maintained about a desired angular velocity. The system monitors the timing between the timing signal generators to reduce the possibility of motor stall, for example, when control passes from the first timing signal generator to the second.

20 Claims, 9 Drawing Sheets

SYSTEM WITH MOTOR CONTROL USING MULTIPLE TIMING SIGNAL GENERATORS

FIELD OF THE INVENTION

Embodiments of the present invention relate to systems with motor control based on multiple timing signal generators and to methods of motor control.

BACKGROUND OF THE INVENTION

Stepper motors are used in a variety of paper handling equipment. For example, in a conventional printer, stepper motors are used to move paper through the printing mechanism. Also, in a conventional plotter, two stepper motors are used to move the plotting pen to plot an image on paper.

A stepper motor is ordinarily operated with only gradual changes in angular velocity to avoid a motor stall. Such a motor is driven by two or more bilevel signals. In response to each level change of a drive signal, the motor turns its rotor an incremental angle. A motor is said to stall when its rotor fails to advance as directed by a motor drive signal. The motor will not stall if a level change is received when the rotor has turned enough to enter a limited angular range. If a level change is received before the rotor has entered this angular range, or after the rotor has turned beyond the range, the motor may stall.

A motor stall in a printer, for example, interrupts the printing process. It may then become necessary for an operator to remove partially printed paper and restart the printing process. Such intervention by an operator adds delay and increases the cost of operating the printer and the associated computer system.

SUMMARY OF THE INVENTION

According to various aspects of the present invention, a system with motor control uses multiple timing signal generators to control a stepper motor. Control is based on a first timing signal generator when changing the motor's angular velocity. Control is based on a second timing signal generator when the motor's angular velocity is to be maintained about a desired angular velocity. The system monitors the timing between the timing signal generators to reduce the possibility of motor stall, especially when control passes from the first timing signal generator to the second.

An apparatus according to the present invention includes, at least, a first and a second timing signal generator and a selector. The first timing signal generator produces a first signal having indicia of timing information at a constant first interval. The first signal may be used to drive a motor at a substantially constant angular velocity. The second timing signal generator produces a second signal having indicia of timing information at a varying second interval. The second signal may be used to drive the motor at a changing angular velocity. The selector performs a transition between controlling motor rotation: (1) at a varying (e.g., accelerating) angular velocity; and (2) about a constant angular velocity. The selector provides output signals for motor control, at a varying third interval, to the motor based on the first signal and the second signal. The apparatus reduces the possibility of motor stall by assuring that the third interval remains within a desired range. The desired range may extend from the second interval to the first interval.

In operation, the apparatus may perform two types of transitions of motor control. When performing a so-called varying-to-constant transition from controlling motor rotation at a varying (e.g., generally increasing or decreasing) angular velocity to controlling motor rotation about a constant angular velocity, the selector continues providing output signals at the second interval until an expected interval between the previously provided output signal and a next occurrence of the first signal falls within the desired range. When performing a so-called constant-to-varying transition from controlling motor rotation about a constant angular velocity to controlling motor rotation at a varying (e.g., generally increasing or decreasing) angular velocity, the selector continues providing output signals at the first interval until an expected interval between the previously provided output signal and a next occurrence of the second signal falls within the desired range.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENT

A system of the present invention includes any system for controlling a motor with pulsed driving signals to avoid stalling of the motor. When motor control is used for handling paper, such a system may include additional functions such as printing or plotting. A printer according to various aspects of the present invention includes an interface for receiving a description of data to be printed, a bus for communicating the data to a processor for formatting data, controls and displays for use by an operator, a paper path including a print engine for handling paper and printing on the paper, and a motor controller for controlling motors along the paper path. For example, printer 100 of FIG. 1 includes I/O interface 110, bus 112, processor 114, controls and displays 116, motor controller 118, print engine 124, and paper path 120.

Figure 1:
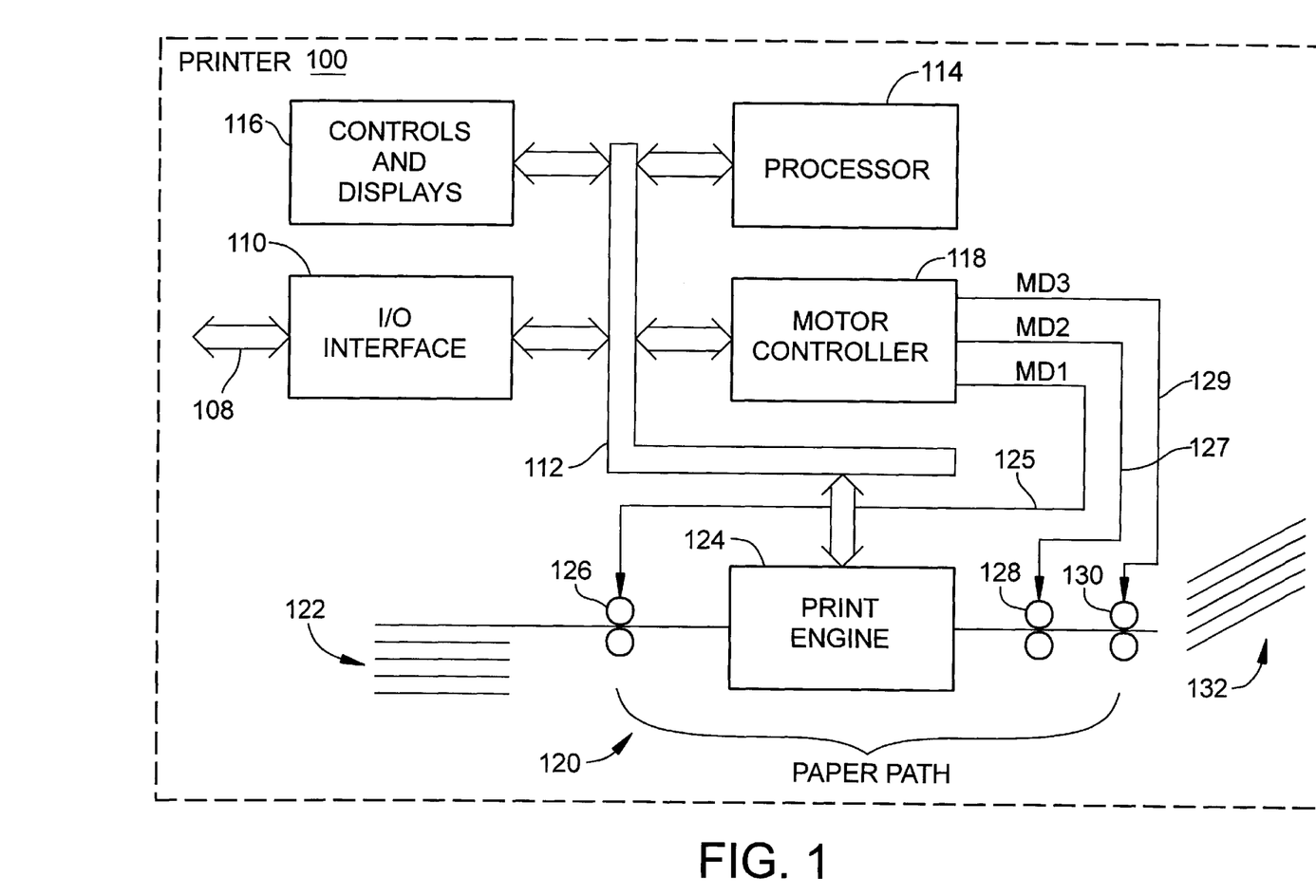
FIG. 1 is a functional block diagram of a printer according to various aspects of the present invention.

An I/O interface couples a printer to a computer network or computer system. An I/O interface includes circuits for receiving commands and data to be printed and for providing status of printer operation. For example, I/O interface 110 couples printer 100 to a network via line 108 and includes any conventional circuits for receiving command messages and data messages and for providing status messages according to various conventional protocols (e.g., PCL protocol marketed by Hewlett Packard Co.).

Figure 3:
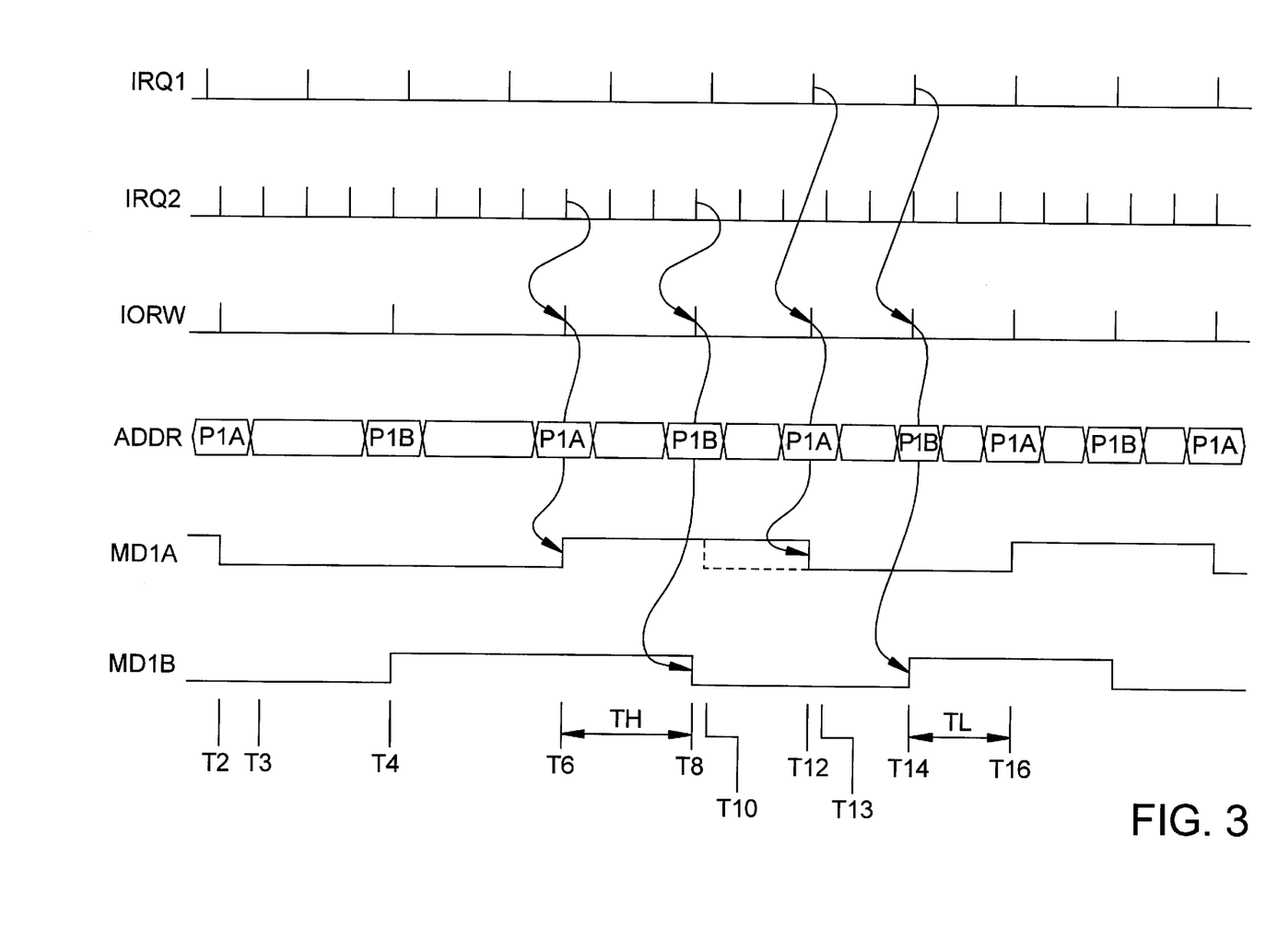
FIG. 3 is a timing diagram of exemplary operation of the motor controller of FIG. 2.
Figure 9:
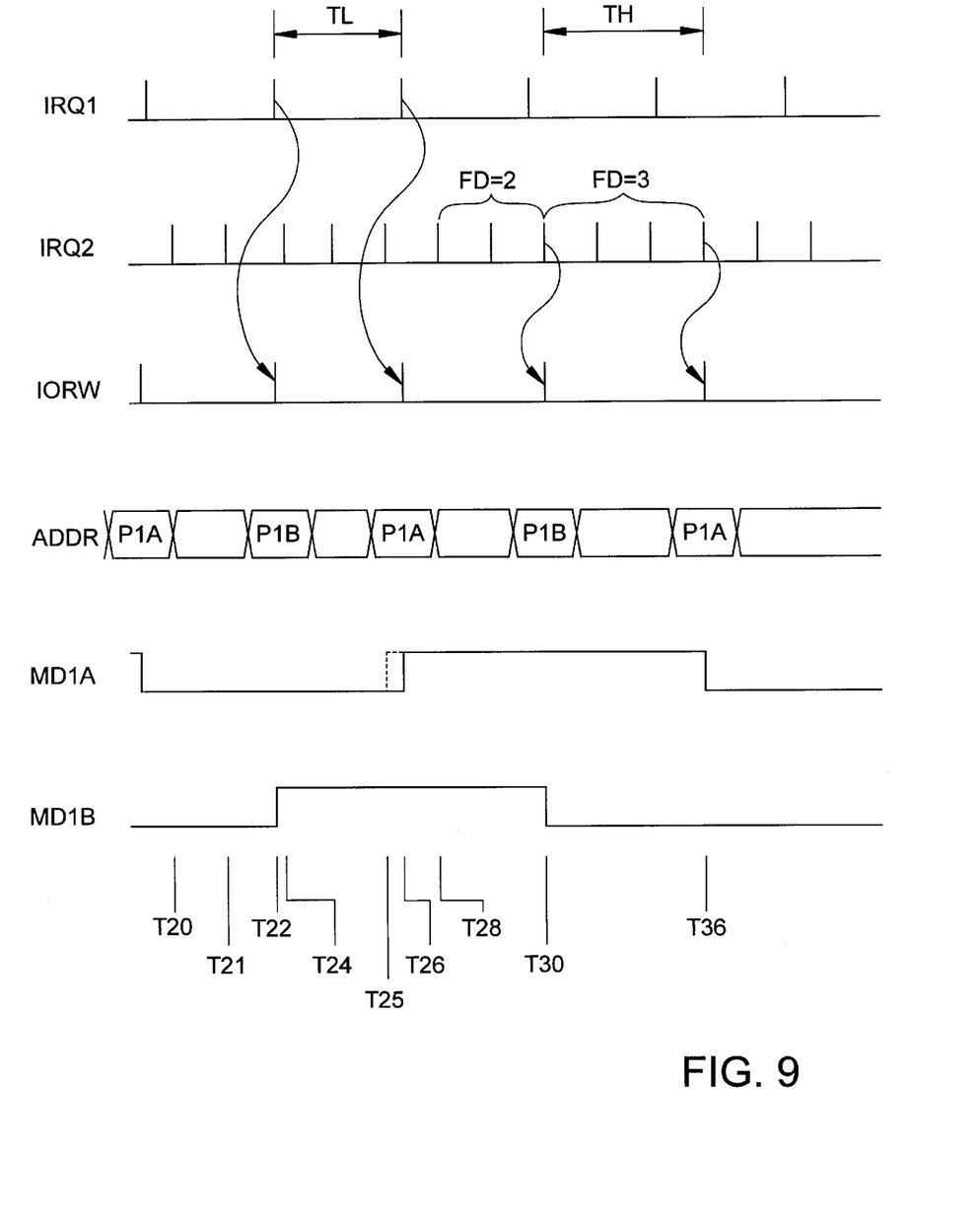
FIG. 9 is a timing diagram of exemplary operation of the motor controller of FIG. 2.

In the timing diagrams of FIGS. 3 and 9, the signal ADDR is expanded for clarity to identify the particular port being addressed during each pertinent read/write instruction of an interrupt service routine. The relevant time when a port identity is evident on signal ADDR begins after occurrence of the respective interrupt signal (IRQ1 or IRQ2) and extends beyond the duration of the IORW signal, as described below.

Controls and displays facilitate operator interaction with the printer. For example, controls and displays 116 include conventional circuits for various switches (or a keyboard), an alphanumeric/graphic display, and various discrete indicators. Control switches may include, for example, on-line and reset. Displays may include, for example, paper status (e.g., empty, jammed) and protocol status.

A processor provides, inter alia, overall control of printing functions including preparation of commands for the print engine, motor controller, and controls and displays in response to commands received via the I/O interface. For example, processor 114 includes a conventional microprocessor circuit programmed to perform methods including, for example, receiving and sending messages via bus 112 and I/O interface 110, formatting received data for control of print engine 124, sensing operator controls and providing operator information displays via controls and displays 116, and commanding motor controller 118 to perform a sequence of motor control operations to control paper path 120. Bus 112 is primarily controlled by processor 114 and includes a conventional parallel digital communication bus. Processor 114 communicates in a conventional manner with I/O interface 110, controls and displays 116, motor controller 118, and print engine 124 by sending commands and receiving status via bus 112.

The paper path of a printer includes various conventional sensors and paper handling devices for passing paper from a supply through the print engine to an output bin. For example, paper path 120 includes input paper supply 122, print engine 124, output paper bin 132, stepper motors 126, 128, and 130, and various sensors that report on the location and orientation of paper along the paper path. In a variation, the output paper bin is replaced by a paper processing device for stapling, hole punching, gluing, stitching, or other paper finishing operations. Such a paper processing device may include several stepper motors controlled by motor controller 118 in a manner analogous to control of motors 126, 128, and 130.

Motors 126, 128, and 130 may be of the type known as stepper motors, for example, as marketed by Airpax Inc. as S42M048T36-M1 or by NMB Co. as PM55L-048-ZGL2A. Motors of this type have a multiple-pole permanent magnet rotor and a multiple-pole stator and may be stepped a given number of degrees (e.g., 7.5 degrees) for each level change of one or more bilevel motor drive signals applied to windings of the stator. The multiple pole stator may provide alternating poles in two winding groups with a first pair of conductors for driving all poles of the first group and a second pair of conductors for driving all poles of the second group.

A print engine includes any conventional mechanism for forming visual indicia on various media. For example, print engine 124 receives commands directing printing operations from bus 112 and includes a suitable electrophotographic printing mechanism for printing text and graphics on paper. In a variation, print engine 124 includes an ink jet printing mechanism.

In another system according to various aspects of the present invention, motor control is used for controlling the position of a pen for plotting text and graphics on media. Such a system includes many components similar to the components of printer 100 and includes stepper motors for positioning one or more pens; such motors being of the type described above.

A motor controller according to various aspects of the present invention provides signals for driving one or more motors in a way that reduces the possibility of a motor stall. Such a motor controller may be implemented with analog or digital circuits, a combination of analog and digital circuits, and/or programmable digital processing circuits operative according to a method that is organized as a computer program and stored in a memory device. For a printer, a motor controller implemented with a programmable digital processing circuit approach may include a processor interface for communication with the processor of the printer, a central processing unit for performing a stored control program, a memory for program and variable storage, two timers, and I/O circuits that facilitate provision of motor drive signals directed by the central processing unit. For example, motor controller 118 of FIG. 2 receives commands via bus 112, as discussed above, and provides signals MD1, MD2, and MD3 on lines 125, 127, and 129 for operating motors 126, 128, and 130, respectively. Motor controller 118 starts, operates at various angular velocities, and stops each motor from time to time during printing to move paper along paper path 120. (In general, motors may be stopped to stop paper movement, to conserve power, to reduce heat dissipation, and to reduce operating noise.) Motor controller 118 includes processor interface 202, central processing unit (CPU) 204, bus 206, memory 208, timers 210 and 212, motor I/O circuit 214, and motor drivers 216, 218, and 220.

Figure 2:
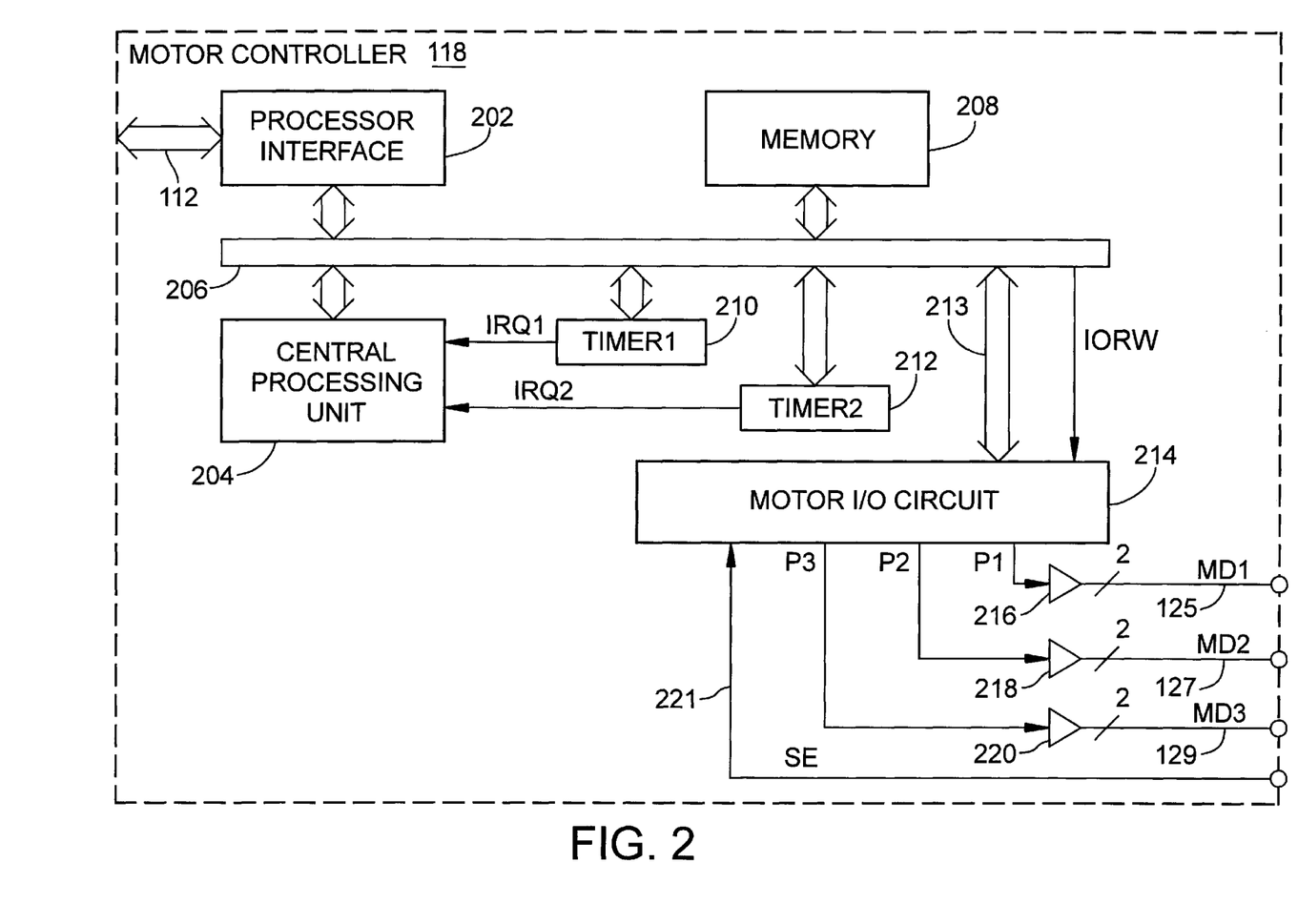
FIG. 2 is a functional block diagram of the motor controller of FIG. 1.

A processor interface coordinates communication between a first bus controlled by a first processor and a second bus controlled by a second processor. For example, communication between processor 114 and CPU 204 is controlled by processor interface 202. Processor interface 202 may include conventional circuits for signal level conversion, timing synchronization, interrupt priority coordination, bus arbitration, and direct memory access.

A central processing unit performs a stored program for motor control. For example, CPU 204 may be any conventional microprocessor. In a preferred variation, CPU 204 includes a microprocessor of the type marketed by Intel Corp. identified as MCS-51 series compatible. CPU 204 performs instructions fetched from memory 208; modifies values of variables in memory 208; initializes, starts and stops timers 210 and 212; and reads status from and writes output control data to motor I/O circuit 214. Operations with memory 208 are extended in a variation to operate with memory devices of any conventional type providing access directly via bus 206 or via processor interface 202. A memory device is a type of data storage device. A data storage device includes any volatile or nonvolatile, removable or nonremovable device that suitably provides read-only, or read/write access to data for use by a digital electronic circuit.

Instruction fetch operations by CPU 204 are affected in a conventional manner by interrupt signals IRQ1 and IRQ2 provided by timers 210 and 212. In general, CPU 204 performs a main program until interrupted and then performs an interrupt service routine corresponding to the source of the interrupt (e.g., IRQ1). When performance of the interrupt service routine is complete, control returns to the main program.

A bus for coupling a central processing unit to memory and peripheral circuits may include any number of parallel conductors, conventionally conveying address signals, bidirectional data signals, and status and control signals. For example, bus 206 includes conductors for a 16-bit address signal ADDR, an 8-bit data signal DATA, and read/write signals including memory read/write signal and input/output read/write signal IORW; all of which cooperate according to the specification for the Intel MCS-51 series microprocessors.

A timer includes any counter circuit which when initialized and started, counts from the initialized value, provides a signal when a limit count is reached, and may reset to the initial condition for repeating these operations. For example, timers 210 and 212 are of the type included in an 8051 type processor as discussed above.

A motor I/O circuit facilitates the generation of signals by a CPU for operation of a stepper motor. A motor I/O circuit may include any conventional parallel I/O port controller, for example, a peripheral interface adapter of the type compatible with the Intel 8051 microprocessor. In addition to providing latched outputs and buffered inputs, a motor I/O circuit may include timers so that such timing functions may be omitted from the central processing circuit. For example, motor I/O circuit 214 includes addressable latches for outputting two bits parallel for each of three ports P1, P2, and P3; and includes an input port for receiving shaft encoder signal SE. Each output port is written by CPU 204 then CPU 204 provides address signal ADDR that identifies the desired port, provides signal DATA that identifies a desired logic transition (consequently an output signal, e.g., a motor drive signal level change), and provides the input/output read/write signal IORW to accomplish the write operation in a conventional manner. Signals ADDR and DATA are conveyed on line 213 from CPU 204 to motor I/O circuit 214.

A motor drive circuit responds to a low current, low voltage, binary digital signal (e.g., as provided by a motor I/O circuit) and provides a motor drive signal suitable for energizing one or more stator magnet coils of a stepper motor for operation at a desired mechanical power, an instantaneous product of torque and angular velocity. For example, motor drive circuits 216, 218, and 220 are identical for operating identical motors 126, 128, and 130. A motor drive signal may be conveyed on one or more conductors. For instance, signal MD1, may include two bilevel, bi-phase signals conveyed respectively on one of two conductors as signals MD1A and MD1B.

Motors 126, 128, and 130 operate in a conventional manner in response to motor drive signals. For example, for each level change of bilevel signal MD1A motor M1 moves one step; that is, the rotor of motor M1 moves toward alignment with a pole of the stator that is adjacent to the pole with which the rotor was previously aligned. Direction of rotation is responsive to the first occurrence of a level change on MD1A versus MD1B. For example, at each of times T2, T4, T6, T8, T12, T14, and T16 of FIG. 3, motor 126 advances one step in response to a consecutive output signal (e.g., a logic transition received by motor drive circuit 216 or a level change of either of signals MD1A or MD1B).

During operation of printer 100, CPU 204 writes initial values to timers 210 and 212 and starts each timer to provide repetitive interrupt signals IRQ1 and IRQ2. When all motors 126, 128, and 130 are stopped (or to be stopped), CPU 204 writes ports P1, P2, and P3 to provide motor drive signals consistent with a stopped condition. When operation of one or more motors 126, 128, and 130 is desired, processor 114 provides motor drive commands via bus 112 to processor interface 202. Processor interface 202 provides these commands to CPU 204 via bus 206. To execute each received command, CPU 204 may write various parameter values in memory 208 and execute various subroutines from memory 208 in accordance with current parameter values. Subroutines may include a so-called main routine and interrupt service routines that operate in response to signals IRQ1 and IRQ2 provided by timers 210 and 212. Instructions of the main routine or interrupt service routine enable CPU 204 to communicate with motor I/O circuit 214 for providing motor control signals at ports P1, P2, and P3. These signals are buffered and amplified by conventional motor drive circuits 216, 218, and 220 as discussed above to provide motor drive signals MD1, MD2, and MD3.

According to various aspects of the present invention, a central processor executing a method of motor control cooperates with timers to provide a plurality of output signals for motor control. Each output signal being separated in time by an interval between output signals. Each interval being identified between two indicia of timing information. For example, timers 210 and 212 may be operated to provide signals IRQ1 and IRQ2 during a portion of the varying-to-constant angular velocity transition of FIG. 3. In FIG. 3, each level change of each bilevel motor drive signal MD1A and MD1B is provided as a consequence of an output port write instruction to port P1 of one of two interrupt service routines performed by CPU 204. In a motor control mode of operation for varying angular velocity (herein called VAV mode), upon a desired execution of the IRQ2 interrupt service routine, an output port write instruction is executed (e.g., at times T6 and T8) to provide assertion of signal IORW with a port P1 bit address (identified as signal ADDR having a value P1A or P1B). In a motor control mode of operation for constant angular velocity (herein called CAV mode), upon a desired execution of the IRQ1 interrupt service routine, an output port write instruction is executed (e.g., at times T12 and T14) to provide assertion of signal IORW with a port P1 bit address (identified as signal ADDR having a value P1A or P1B).

The duration of the count used by timer 212 governs the separation interval between output signals for each bilevel signal MD1A and MD1B while in the VAV mode. Likewise, the duration of the count used by timer 210 governs the separation interval between output signals for each bilevel signal MD1A and MD1B while in CAV mode. For example, timer 212 may be programmed to generate signal IRQ2 at an interval (e.g., from time T2 to time T4) of about 500 microseconds; and, timer 210 may be programmed to generate signal IRQ1 at a longer interval (e.g., from time T12 to time T14) of about 1890 microseconds. In a variation, timer 212 is programmed to generate a signal IRQ2 for every 16 clock cycles of CPU 204. When such a clock cycle corresponds to a frequency of 16 MHZ, signal IRQ2 is generated at an interval of about 1 microsecond. In such a variation, timer 210 may be programmed to generate signal IRQ1 at an interval in the range of from 4 microseconds to 10 milliseconds.

In a system of the present invention, various motors may be controlled in any combination of VAV and CAV modes. While it is preferred to perform from one timer all operations in a particular mode (e.g., CAV mode as discussed above), multiple timers may be so used in a variation. In addition, each timer used in each mode may be started (or enabled with interrupt service also being enabled), masked (interrupt service being disabled), stopped (disabled), and operated at any desired count without regard to the current state of another timer. When a timer is masked or stopped, the central processing unit takes no action in response to the timer either because interrupt request signals are being ignored when masked or because no interrupt request signals are being provided by the timer when stopped. Having the ability to govern motor drive signal generation from one of two timers that may be in any timing relationship to each other provides design flexibility and simplification of control software. When no motors are being controlled from a particular timer, that timer may be stopped. According to an aspect of the present invention, by stopping a timer, central processing unit overhead is reduced allowing the central processing unit to operate more efficiently. According to another aspect of the present invention, the possibility of motor stall when making a transition between modes of motor control is reduced.

The control functions of a motor drive system of the present invention may be implemented with any extent or combination of nonprogrammable circuitry or programmable circuitry operative with software or firmware. The cooperation of control functions may be better understood for implementation of one or more control functions with either nonprogrammable or programmable circuitry from the functional block diagram of motor drive system 400 of FIG. 4.

Figure 4:
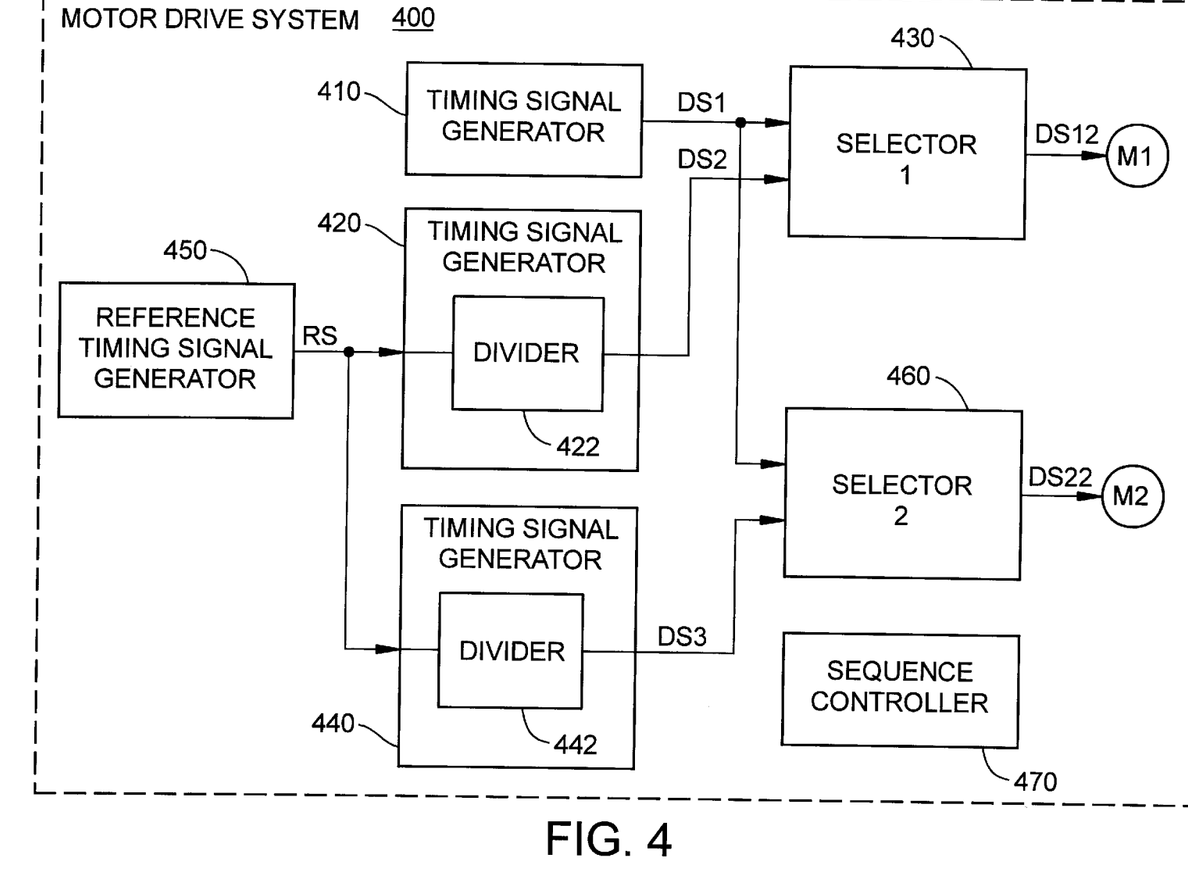
FIG. 4 is a functional block diagram of a motor drive system according to various aspects of the present invention.

Motor drive system 400 includes any nonprogrammable or programmable circuitry that accomplishes functions of a first timing signal generator 410, a second timing signal generator 420, and a selector 430. Timing signal generator 410 generates signal DS1 and provides signal DS1 to any number of selectors, for example, selector 430 and selector 460. Timing signal generator 420 generates signal DS2 and provides signal DS2 to one or more selectors, for example, selector 430. Selector 430 provides motor drive signal DS12 to motor M1.

Motor drive signal DS12 is provided with reference to signals DS1 and DS2. Signal DS1 provides indicia of timing information for operating in a mode of motor control for constant angular velocity (CAV mode). For example, signal DS1 may include a succession of pulses uniformly separated in time by a substantially constant interval. Signal DS2 provides indicia of timing information for operating in a mode of motor control for varying angular velocity (VAV mode). For example, signal DS2 may include a succession of pulses uniformly separated in time by a constant interval that is shorter than the interval of signal DS1. In system 400, logic transitions (also called active edges) may provide indicia of timing information. In variations, other signal features may be used for timing information. In system 400, each level change corresponding to the leading or trailing edge of a pulse of motor drive signal DS12, may be provided by selector 430 in response to a logic transition corresponding to the leading or trailing edge of a pulse of either signal DS1 or DS2. For example, in FIG. 3, active edges (either leading or trailing) of signals IRQ1 and IRQ2 are each shown as a single vertical line. Selected active edges result in level changes of motor drive signals as indicated by lines having arrow heads from such an edge to a resulting transition.

Motor drive system 400 includes a sequence control function. Sequence control identifies a progression of modes of motor control for one or more motors. For example, sequence control 470 may direct selector 1 to operate motor M1 to accelerate (or decelerate) the angular velocity of motor M1 until a first limit condition is reached, maintain the angular velocity about a constant velocity until a second limit condition is reached, and either repeat these motor control operations any number of times with possibly other limit conditions, or not repeat them.

Selector 430 performs each transition between modes of motor control for motor M1. Selector 430 ensures that each interval between successive output signals (e.g., level changes) of motor drive signal DS12 is greater than a minimum interval and less than a maximum interval so as to reduce the possibility of stall in motor M1.

Motor drive system 400 also includes, timing signal generator 440, reference timing signal generator 450, and selector 460. Timing signal generator 440 provides signal DS3 to selector 460. Selector 460 provides motor drive signal DS22 to motor M2 in response to signals DS1 and DS3. Timing signal generator 440, selector 460, drive signal DS3 and motor drive signal DS22 are of the type described above with reference to timing signal generator 420, selector 430, signal DS2, and motor drive signal DS12. Motor drive signal DS22 is provided independently of such counterpart components for independent control of motor M2. In variations, an additional timing signal generator and selector analogous to timing signal generator 440 and selector 460 may be included for each group of motors to be controlled in a manner independent of other motor groups.

In addition to independent control, common control may be accomplished with common use of signal DS1 provided to both selectors 430 and 460. When motors M1 and M2 are both being operated in CAV mode, continued operation may proceed from a common signal source. Reference timing signal generator 450, as well as timing signal generators 420 and 440 may be stopped. When any of reference timing signal generator 450, and timing signal generators 420 and 440 are implemented in software, more efficient operation of the processor that executes such software may result when these functions are stopped. By implementing one or more timing signal generators and/or selectors in software, manufacturing and operating costs may decrease and system reliability may increase.

Reference timing signal generator 450 provides reference signal RS to timing signal generators 420 and 440. Reference signal RS includes indicia of timing information at a fixed frequency for use as a time base. Each timing signal generator 420 and 440 includes a divider 422 and 442 for providing the respective drive signal DS2 and DS3 in accordance with a frequency division operation performed with signal RS. By using a common reference time base, for example an oscillator circuit, multiple timing signal generators may be efficiently implemented in software.

Each divider 422 and 442 may perform a series of frequency division operations. Each such operation may employ a different frequency divisor for providing a different interval between successive output signals of signal DS2 and DS3. For example when an integer frequency divisor is used, the resulting rate of occurrence of indicia of timing information will be an integer fraction of the initial rate. Conversely, the resulting interval between indicia of timing information will be an integer multiple of the initial interval.

Operation of motor drive system 400 may be better understood from a sequence of motor control operations as applied to motor M1. An exemplary sequence of operations in a main routine 500 or FIG. 5 includes three steps.

Figure 5:
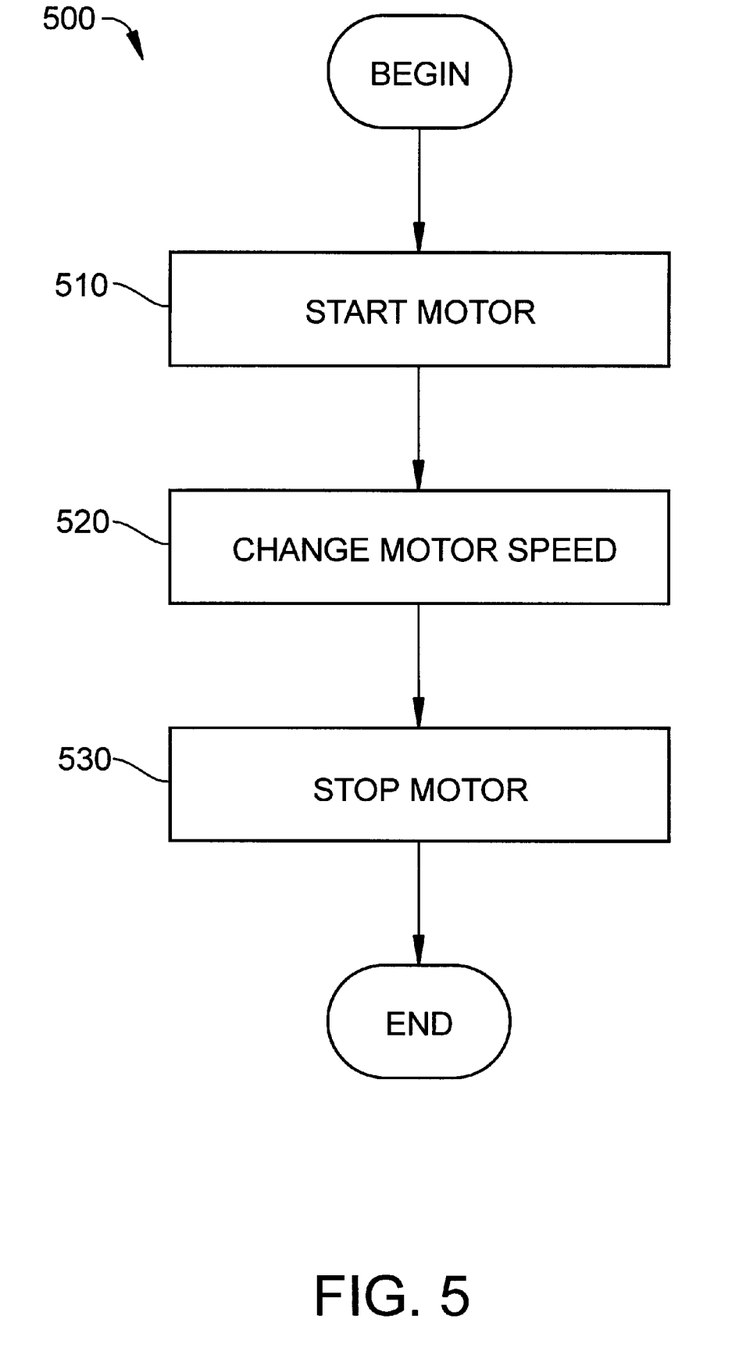
FIG. 5 is a flow diagram of a main routine for controlling a motor according to various aspects of the present invention.

At step 510, motor M1 is started, that is the angular velocity motor M1 is increased from zero to a first target velocity and maintained at the first velocity. This result is accomplished by a VAV mode of operation for acceleration from the initial zero angular velocity to a target velocity, a VAV-to-CAV mode transition (i.e. a varying-to-constant transition), and finally a CAV mode of operation at the target velocity.

At step 520, the angular velocity of motor M1 is changed from a first velocity to a second target velocity. This result is accomplished by a CAV-to-VAV mode transition (i.e. a constant-to-varying transition), a VAV mode of operation for acceleration (or deceleration), a VAV-to-CAV transition, and finally a CAV mode of operation at the second target velocity.

At step 530, motor M1 is stopped. This result is accomplished by a CAV-to-VAV mode transition, and a VAV mode of operation having a target velocity of zero. On completion of step 530, the main routine is complete.

Operations performed by steps 510 through 530 set initial values in a conventional manner for enabling interrupt service routines discussed below. For example, timer 210 which provides signal IRQ1 is set (when not in use) for a rate that facilitates subsequent operation in CAV mode at the desired target velocity. Timer 212 which provides signal IRQ2 may be set (when not in use) to a rate that facilitates a desired velocity increment. Too large an increment may risk a motor stall based on changing load conditions; whereas, too small an increment may consume excessive CPU cycles. Other initial conditions will become apparent below with reference to FIGS. 6 through 8.

In performing this sequence of motor control modes and transitions, selector 430 provides motor drive signal DS12 in a VAV mode, in a CAV mode, and performs mode transitions. In a VAV mode, motor drive signal DS12 is provided in response to indicia of timing information conveyed by signal DS2. In a CAV mode, motor drive signal DS12 is provided in response to indicia of timing information conveyed by signal DS1. To perform a transition, selector 430 calculates a projected interval between a last provided output signal DS12 and a next interrupt request (IRQ1 for a VAV-to-CAV; and IRQ2 for a CAV-to-VAV), compares the projected interval to limit conditions (e.g. values determined before the next interrupt request occurs) and directs the provision of the next output signal DS12, based on the comparison, by selecting timing indicia from the signal currently not in use (DS1 or DS2) at a time that reduces the likelihood of a motor stall. When the comparison does not permit the transition, the next interrupt request may be ignored and a following interrupt request of the same type may accomplishes the transition.

In an implementation of a motor drive system 400 as printer 100, motor controller 118 performs a VAV-to-CAV transition as in FIG. 3. Before time T8, selector 430 provides motor drive signal DS12 (i.e., signals MD1A and MD1B) in response to active edges of signal IRQ2. After time T12, selector 430 provides motor drive signal DS12 in response to active edges of signal IRQ1. At time T8, the interval (or time period) is too short between the last provided output signal at T8 (a level change of signal MD1B) and the next indicia of timing information of signal DS1 (an active edge of IRQ1 at T10). If the indicia of timing information of signal DS1 at time T10 were selected to provide an output signal at T10 (as shown by a dotted line on signal MD1A), a motor stall may result. The interval from time T8 to time T12 (called TC below) as shown in the example of FIG. 3 is not longer than a maximum time TH shown as the interval from time T6 to time T8 between successive output signals in VAV mode nor shorter than a minimum time TL shown as the interval from time T14 to time T16 (equivalent from T10 to T12). Selector 430 delays the VAV-to-CAV mode transition until time T12 (ignoring IRQ1 at T10) because the interval from time T8 to time T10 was not within a predetermined range. The interval from time T8 to time T12 was within the predetermined range.

Motor controller 118 also performs a CAV-to-VAV transition as in FIG. 9. The VAV mode is to begin at a an angular velocity slightly slower than the angular velocity of the CAV mode. When the VAV mode begins, the interval from time T21 to time T22 will be multiplied by an integer 3 to form the interval from time T30 to time T36 for the first velocity increment. Before time T26, selector 430 provides motor drive signal DS12 (i.e., signals MD1A and MD1B) in response to active edges of signal IRQ1. After time T30, selector 430 provides motor drive signal DS12 in response to active edges of signal IRQ2. At time T22, a projected interval is calculated as the sum of two intervals TC and TD. Interval TC extends from the last provided output signal at T22 (a level change of signal MD1B) and the projected next indicia of timing information of signal DS2 (an active edge of IRQ2 at T24). Interval TD is calculated from the interval from time T21 to time T22 multiplied by one less than the integer to be used in the first velocity increment. If the mode transition to VAV mode were made at time T24, an output signal at T25 (as shown by a dotted line on signal MD1A) would be provided at too short an interval from time T22 to time T25 and a motor stall may result. The interval from time T26 to time T30, on the other hand, is not longer than a maximum time TH shown as the interval from time T30 to time T36 between successive output signals in VAV mode nor shorter than a minimum time TL shown as the interval from time T22 to time T26. Selector 430 delays the CAV-to-VAV mode transition until time T28 (ignoring IRQ2 at T24) because the interval from time T22 to time T25 was not within a predetermined range. The interval from time T22 to time T26 was within the predetermined range.

To be within the predetermined range a given period is not less than a lower limit TL and not greater than an upper limit TH. The value of the lower limit (T14 to T16 in FIG. 3; or T30 to T36 in FIG. 9) depends on the motor's maximum angular velocity capability and inertia. For example, a lower limit of 0.83 milliseconds may be used for a motor having a maximum angular velocity of 1200 steps per second and typical inertia. For convenience, the lower limit may be approached by the interrupt request rate during CAV mode (i.e., IRQ1). The value of the upper limit may be the presently occurring interval between successive output signals in VAV mode, for example the time period from time T6 to time T8, or analogously, from time T24 to T26).

In an implementation of motor drive system 400 where the functions of timing signal generators and selectors are implemented in software, such software may be organized as a main routine that is interrupted by one or more interrupt service routines. The interrupt service routines may respond to timing events that identify the physical passage of time so that pulse durations and intervals between pulses may be generated with suitable accuracy to real time. The interrupt service routines may further perform the function of a sequencer (e.g. as from a table of predefined motor drive commands), or the function of a sequencer may be provided by the main routine. In a variation where the main routine has no other function than to dictate the sequence of motor control operations (as in FIG. 5 discussed above), the main routine may include null operations that do nothing while awaiting the occurrence of another interrupt.

As discussed above, motor drive system 400 may be implemented by methods performed by a central processor. For example, in printer 100, CPU 204 may perform methods of the type described below with reference to FIGS. 6 through 8. Further, any system having any central processor for motor control (such as a pen positioning subsystem of a plotter, or any mechanical system having stepper motors) may execute such methods in whole or in pertinent part.

A method of the present invention includes any sequence of steps that perform the functions of a selector as described above with reference to a motor control system, e.g., motor control system 400. For example, in printer 100, CPU 204 performs interrupt service routine 600 of FIG. 6 in response to signal IRQ1 and performs interrupt service routine 700 of FIGS. 7 and 8 in response to signal IRQ2.

Figure 6:
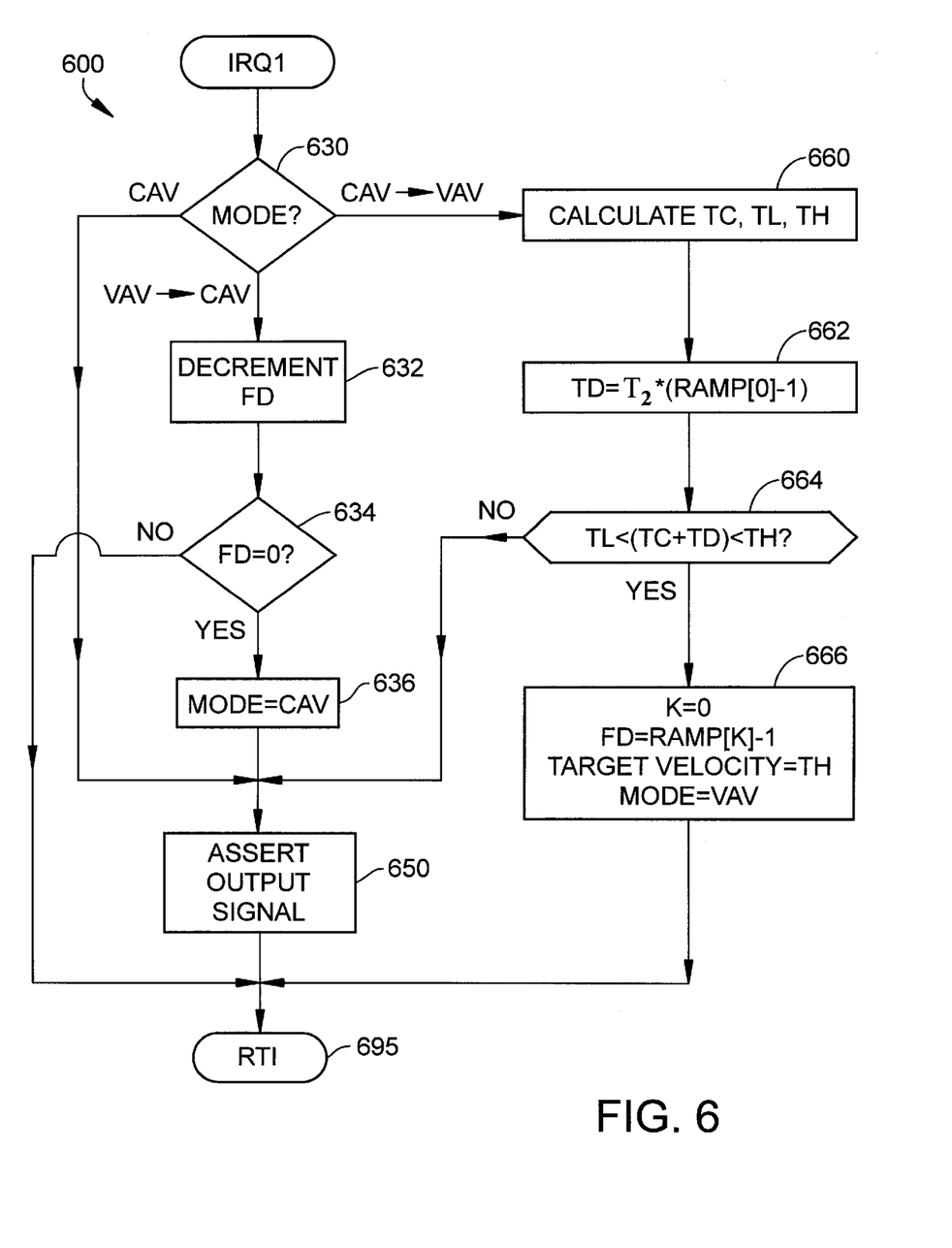
FIGS. 6 through 8 present flow diagrams of interrupt service routines performed by a selector of FIG. 4.

A VAV-to-CAV transition according to various aspects of the present invention is implemented by method 600. When CPU 204 responds to an active edge of signal IRQ1, program control passes to step 630. At step 630, variable MODE is tested to determine whether a CAV mode is to continue or a transition is to be performed. If a VAV-to-CAV transition is to be performed, program control passes to step 632. If a CAV-to-VAV transition is to be performed, program control passes to step 660. Otherwise motor control is to continue in CAV mode; and, program control passes to step 650.

At step 650, CAV mode is continued by asserting an output signal, for example a suitable level change on either signal MD1A or MD1B. Program control then passes back to the main routine at step 695.

At step 632, frequency divisor variable FD is decremented. Variable FD is set by interrupt service routine 700 to a value greater than the lower limit of the range discussed above with reference to time T10.

At step 634, it is determined whether variable FD has been decremented to zero. During a VAV-to-CAV transition, interrupt service routine 600 might not provide an output signal. For example, signal IRQ1 at time T10 has no effect. If variable FD is nonzero, program control passes back to the main routine at step 695. Otherwise variable FD is zero; and, providing an output signal will not likely result in a stall of motor M1. Program control passes to step 636.

At step 636, variable MODE is set to indicate the VAV-to-CAV transition has been completed. By setting variable MODE to a constant indicating CAV mode of motor control, CAV mode will continue as described above with reference to step 650.

At step 660, a first portion of a projected interval between successive output signals (TC), a lower limit (TL), and an upper limit (TH) are determined as discussed above. For example, in a CAV mode, TC may be calculated from the time between the last occurring IRQ1 and the next occurring IRQ2. The next occurring IRQ2 may be determined by CPU 204 by reading the remaining count in timer 212 as discussed above.

At step 662, the second portion of the projected interval between successive output signals (TD) may be calculated as discussed above. For example, the period of timer 212 may be multiplied by the first integer frequency divisor less one. The period of timer 212, e.g. the interval T20 to time T21 of FIG. 9, may be read from timer 212 or from the constant in memory 208 last used to initialize timer 212. The first integer frequency divisor may be identified by an algebraic calculation or by an index to an array of divisors as discussed below.

At step 664, the sum TC plus TD is tested to determine whether the projected interval is within the predetermined range from interval TL to interval TH. If not, program control passes to step 650 and motor control continues in CAV mode. If so, program control passes to step 666.

At step 666, initial conditions for entering VAV mode are made. The index variable K is set to the first entry of the table, e.g., zero. The frequency divisor variable FD is set to the first entry of the table less one, as discussed above. A variable is set to distinguish deceleration to a target angular velocity and re-entry of CAV mode from deceleration to zero angular velocity. And, the variable MODE is set to VAV to indicate completion of the CAV mode of motor control. Program control then passes back to the main routine via step 695.

Figure 7:
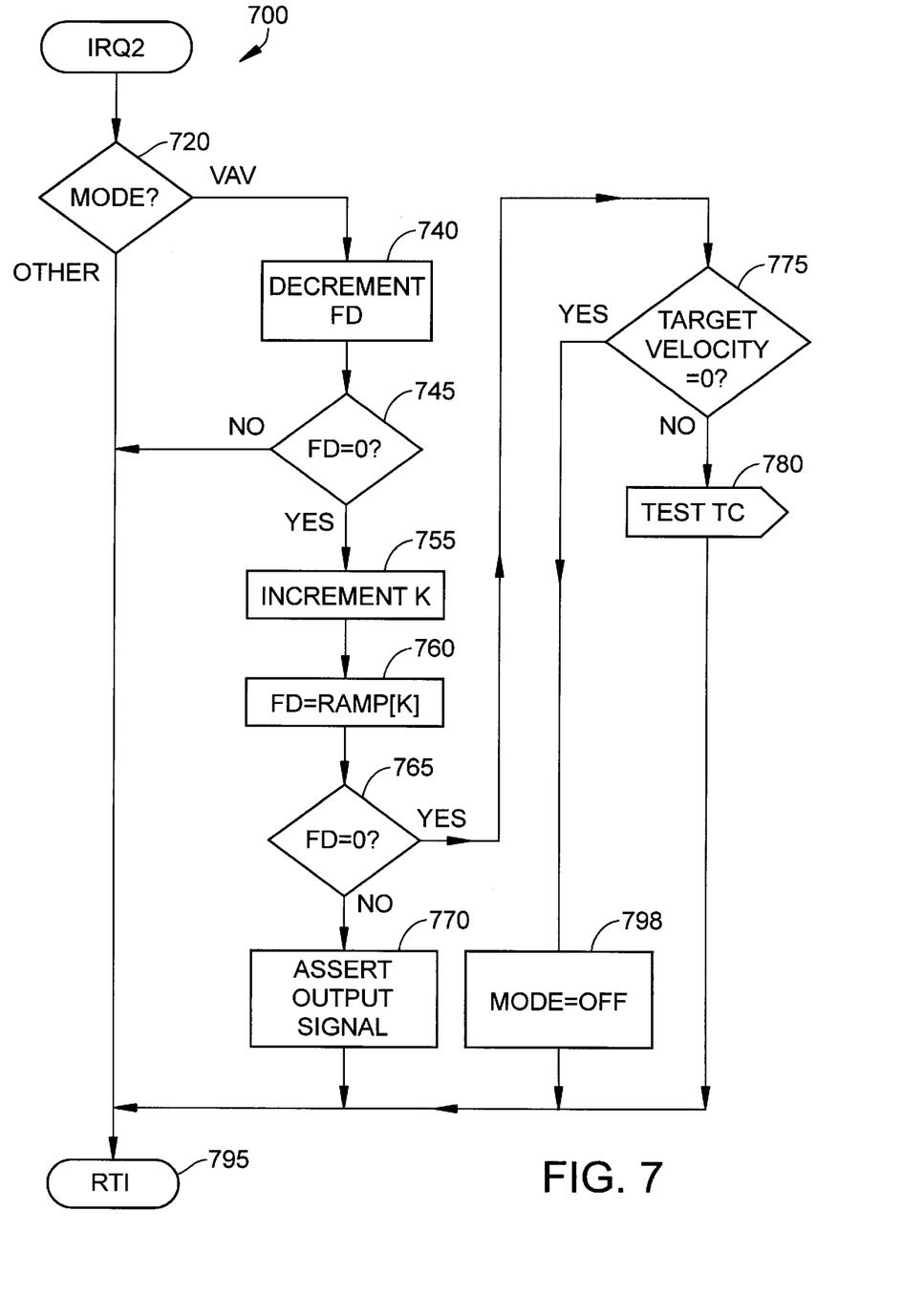

When CPU 204 responds to an active edge of signal IRQ2, program control passes to step 720 of FIG. 7. At step 720, variable MODE is tested to determine whether control should continue in a VAV mode. If so, program control passes to step 740. If not, program control passes back to the main routine via a return from interrupt at step 795.

At step 740, frequency divisor variable FD is decremented.

At step 745, it is determined whether variable FD is zero. If not, no further action is taken and program control passes back to the main routine via step 795. Operation of step 745 on successive performances of method 700 accomplishes a function of divider 422 discussed with reference to FIG. 4.

Steps 755 through 770 provide output signals that result in a varying angular velocity. A series of intervals between successive output signals may be prescribed by an interval specifying algorithm (e.g., an algebraic calculation). In a preferred variation, such a series is prescribed by a table stored in memory and organized as a one-dimensional array, indexed by a variable. In an alternate and equivalent variation, the array is accessed as a linked list. When one array is used for controlling several groups of motors independently, one index variable may be used for each group. Each interval is determined from the table as an integer number of durations between successive occurrences of signal IRQ2 to be counted down to zero. Each interval is read from the table via the index and assigned to a frequency divisor variable FD.

A table may contain any number of values suitable for increasing the angular velocity of a particular stepper motor coupled to a particular load. Memory 208 may include any number of tables for different stepper motors or for different ramping operations (e.g., different starting velocities, different ending velocities, or different rates of velocity change). For example, a first ramp sequence may be used to start a motor from an initially stopped condition to a mid-range speed. A second ramp table may be used to further accelerate the same motor from the mid-range speed to a maximum speed. For instance, Table I, describes the contents of a ramp table RAMP indexed by variable K for starting a lightly loaded conventional stepper motor. The 38th value in Table I is zero to indicate the end of the series of intervals prescribed for this particular varying angular velocity. Although divisor values in the table progressively decrease, any combination of increasing and decreasing values may be used in a variation.

TABLE I

| K | RAMP [K] | K | RAMP [K] | K | RAMP [K] | K | RAMP [K] |
|---|---|---|---|---|---|---|---|
| 1 | 41 | 11 | 9 | 21 | 7 | 31 | 5 |
| 2 | 10 | 12 | 8 | 22 | 6 | 32 | 4 |
| 3 | 10 | 13 | 8 | 23 | 6 | 33 | 4 |
| 4 | 10 | 14 | 8 | 24 | 6 | 34 | 4 |
| 5 | 10 | 15 | 8 | 25 | 6 | 35 | 4 |
| 6 | 10 | 16 | 8 | 26 | 6 | 36 | 4 |
| 7 | 9 | 17 | 7 | 27 | 5 | 37 | 3 |
| 8 | 9 | 18 | 7 | 28 | 5 | 38 | 0 |
| 9 | 9 | 19 | 7 | 29 | 5 | | |
| 10 | 9 | 20 | 7 | 30 | 5 | | |

At step 755, index variable K is initialized or incremented; and, a ramp value is read from array RAMP at element K and assigned to variable FD at step 760.

At step 765, it is determined whether variable FD as read from the array is zero, indicating the completion of a ramp series of interval durations. If not, program control passes back to the main routine at step 795. If so, program control passes to step 775.

At step 775, it is determined whether a VAV-to-CAV transition is to be performed. If not, further provision of output signals will cease by virtue of setting variable MODE to OFF at step 798 and program control returns to the main routine via step 795. If so, program control passes to subroutine 780. In a variation, subroutine 780 may be implemented as in-line instructions and is presented here as a subroutine for simplicity of preparing the flow charts of FIGS. 7 and 8.

Steps 782 through 790 facilitate a VAV-to-CAV transition to be completed by interrupt service routine 600 discussed above. At step 780, of FIG. 8, variables TC, TL and TH are determined. For example, variable TC is set to an integer corresponding to an amount of time expected to pass from the last occurrence of an output signal to the next occurrence of an interrupt request (e.g., an active edge of signal IRQ1). The amount of time may be expressed as a number of timer 210 ticks. CPU 204 may determine the value for TC by reading the current value of timer 210 and comparing it to the count (if nonzero) at which the next active edge of signal IRQ1 will be provided by timer 210. Variable TL is set to the lower limit of the predetermined range discussed above, expressed in timer 210 ticks. Variable TH is set to the current number of timer 212 ticks between successive active edges of signal IRQ2 multiplied by the next to last value of variable FD read from the ramp table. Variable TH corresponds to the upper limit of the predetermined range discussed above. A scale factor may be used when timer 212 ticks are of a different duration than timer 210 ticks.

Figure 8:
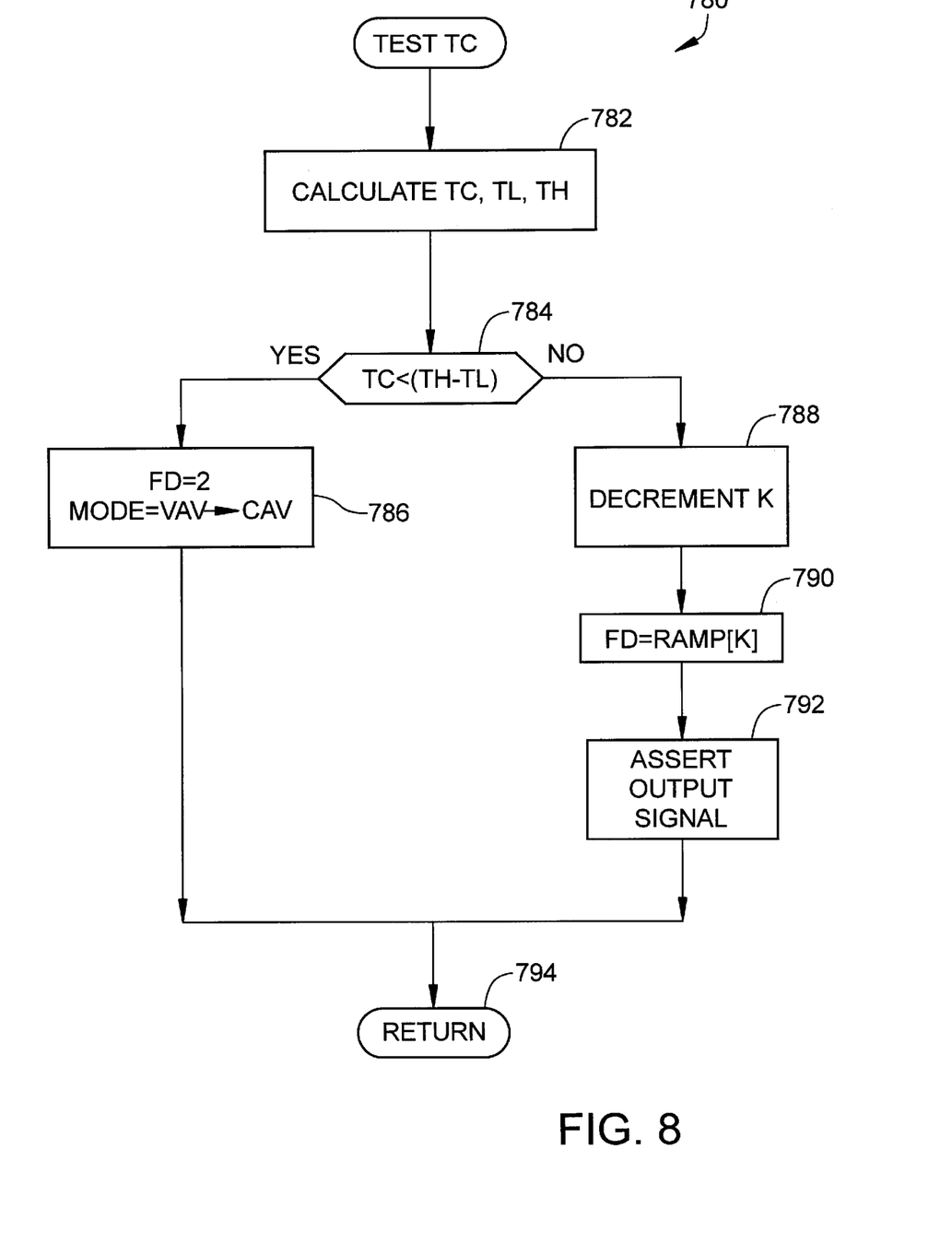

At step 784, it is determined whether a projected interval between successive output signals will be not less than TL and not greater than TH. If this condition is met, the possibility of motor stall is reduced. For example, in an implementation where a CAV mode is controlled at an angular velocity that is (at the time of a VAV-to-CAV transition) always faster than the angular velocity of the last increment of the VAV mode, then the condition is met when a second, simpler condition is met. Therefore, at step 784 if TC is determined to be less than the difference between TH and TL, control passes to step 786 and the transition to CAV mode may be completed by method 600. If not, control passes to step 788 and motor control remains in VAV mode. That is, the next occurring IRQ1 is ignored.

At step 786, variable FD is set to 2 and variable MODE is set to a constant value indicating VAV-to-CAV. This value causes program control to pass from step 630 to 632 as discussed above. Program control then passes back to the main routine via steps 792 and 795.

At step 788, index variable K is decremented so that the previous increment of velocity is repeated.

At step 790 a ramp value is read from array RAMP at element K and assigned to variable FD.

At step 792 an output signal is asserted as discussed above at step 650. Program control then passes back to the main routine via steps 794 and 795.

In a variation ramp-up table values are used in reverse order for ramp-down operations.

In the methods discussed above, prior to asserting a next output signal, a comparison is made and provision of the next output signal is directed in response to a result of the comparison. For example: (a) in a CAV-to-VAV transition, at step 664 a comparison result directs provision of a next output signal at step 770; and (b) in a VAV-to-CAV transition, at step 784 a comparison result directs provision of a next output signal at step 650. In each example, the comparison assures that the interval between successive output signals is within the predetermined range from TL to TH so that the possibility of motor stall is reduced.

In another variation, motor controller 118 includes the facility to support diagnostic testing. When, for a particular motor, the contents of a ramp-up or ramp-down table, or the operation of an interval specifying algorithm, does not reduce the risk of a motor stall to a desirable low level, diagnostic testing may support revising values for such a table or instructions of such an algorithm. These facilities include one or more diagnostic methods stored in memory 208, a conventional shaft encoder suitably arranged to monitor the angular position of the rotor of the particular motor, and a shaft encoder signal SE from the shaft encoder to motor I/O circuit 214 on line 221.

A diagnostic method may include the steps of receiving signal SE and comparing the expected position of the motor shaft (or rotor) to the position indicated by signal SE. In a variation, such a method analyzes signal SE under a variety of predetermined conditions and calculates suitable values for ramp-up and ramp-down tables so that the possibility of a motor stall is further reduced.

As discussed above, systems of the present invention having a processor that performs functions of a motor drive system may be expanded to control any number of motors. As the number of motors to be controlled in independent VAV modes increases processor throughput will decrease. Because systems and methods of the present invention permit stopping interrupt signal sources (e.g. timer 212 or timing signal generators 420 and/or 440) when not needed for motor control, processor throughput capacity can be increased and may then be sufficient for controlling a larger number of motors than possible with conventional systems and methods.

While the present invention has been described in terms of several preferred embodiments, it is contemplated that alterations and permutations thereof will become apparent to those skilled in the art upon a reading of the specification and study of the drawings. The present invention is intended to be defined only by the recited limitations of the claims, and equivalents thereof, rather than by the above description of preferred exemplary embodiments.

What is claimed is:

1. A system for generating a plurality of output signals for stepper motor control, the system comprising:
   a. a first timing signal generator for generating a first timing signal comprising a first interval between consecutive indicia of timing information;
   b. a second timing signal generator for generating a second timing signal; and
   c. a first selector, responsive to the first timing signal and to the second timing signal, for providing the plurality of output signals, wherein:
      (1) the first selector consecutively provides a first and a second output signal of the plurality, the first and the second output signals separated by a second interval;
      (2) the first output signal is provided in response to the second timing signal;
      (3) the second output signal is provided in response to the first timing signal; and
      (4) the second interval is greater than the first interval.

2. The system of claim 1 wherein the first selector comprises:
 a. a memory for storing indicia of a method for motor control;
 b. a central processing unit for executing the method; and
 c. an output circuit for providing the second output signal in accordance with the method.

3. The system of claim 2 wherein:
 a. the first timing signal generator comprises a first counter circuit coupled to the central processing unit for providing the first timing signal to the central processing unit;
 b. a respective interrupt request for the central processing unit is made for each indicia of timing information identifying the first interval of the first timing signal; and
 c. when interrupted, the central processing unit operates the output circuit for generating the second output signal.

4. The system of claim 1 wherein:
 a. the system further comprises a reference timing signal generator for generating a reference timing signal comprising a reference interval between consecutive indicia of timing information;
 b. the second timing signal generator comprises a first frequency divider, responsive to the reference timing signal, for generating the second timing signal; and
 c. the second timing signal comprises a third interval between indicia of timing information, the third interval being an integer multiple of the reference interval.

5. The system of claim 4 wherein the first selector comprises:
 a. a memory for storing indicia of a method for motor control;
 b. a central processing unit for executing the method; and
 c. an output circuit for providing the second output signal in accordance with the method.

6. The system of claim 5 wherein:
 a. the first timing signal generator comprises a first counter circuit coupled to the central processing unit for providing the first timing signal to the central processing unit;
 b. a respective interrupt request for the central processing unit is made in response to each indicia of timing information identifying the first interval of the first timing signal; and
 c. when interrupted, the central processing unit operates the output circuit for generating the second output signal.

7. The system of claim 6 wherein:
 a. the reference timing signal generator comprises a second counter circuit coupled to the central processing unit for providing the reference timing signal to the central processing unit;
 b. a respective interrupt request for the central processing unit is made in response to each indicia of timing information identifying the reference interval of the reference timing signal; and
 c. when interrupted, the central processing unit operates the output circuit for generating the first output signal.

8. The system of claim 7 wherein, while a multiplicity of output signals are being provided each in response to the first timing signal, the central processing unit takes no action in response to the second counter circuit.

9. The system of claim 4 further comprising:
 a. a third timing signal generator for generating a third timing signal; wherein:
  (1) the third timing signal generator comprises a second frequency divider, responsive to the reference timing signal, for generating the third timing signal;
  (2) the third timing signal comprises a fourth interval between indicia of timing information; and
  (3) the fourth interval is an integer multiple of the reference interval and differs in duration from the third interval; and
 b. a second selector, responsive to the first timing signal and the third timing signal, for providing a second plurality of output signals wherein:
  (1) the second selector consecutively provides a third and a fourth output signal of the second plurality, the third and the fourth output signals separated by a fifth interval;
  (2) the third output signal is provided in response to the third timing signal;
  (3) the fourth output signal is provided in response to the first timing signal; and
  (4) the fifth interval is greater than the first interval.

10. The system of claim 4 wherein:
 a. the memory is further for storing a first series of divisor values; and
 b. the second timing signal further comprises a second series of respective intervals, wherein:
  (1) each respective interval is between consecutive indicia of timing information;
  (2) each respective interval is a respective integer multiple of the reference interval; and
  (3) each respective integer multiple is determined by the first frequency divider in accordance with a respective divisor value of the first series.

11. The system of claim 1 formed on an integrated circuit substrate.

12. A printer comprising:
 a. an interface for receiving a description of data to be printed;
 b. a processor for determining data to be printed and determining a command for motor control;
 c. a print engine for receiving the data and printing on provided media; and
 d. a motor controller for moving the provided media in response to the command, the motor controller comprising:
  (1) a first and a second timer for providing respectively a first and a second interrupt request signal;
  (2) an output circuit for providing a bilevel signal for motor control;
  (3) a central processing unit responsive to the first and second interrupt request signals for performing interrupt service; and
  (4) a memory, accessed by the central processing unit for interrupt service, the memory for storing indicia of a method for motor control, the method comprising:
   in response to the second interrupt request signal, determining a first interval from the present time to the time a next occurrence of the first interrupt request signal is expected to occur;
   comparing the first interval to a predetermined interval; and
   directing, in response to the comparison, the provision of the bilevel signal in response to a following occurrence of the first interrupt request signal that follows the next occurrence of the first interrupt request signal.

13. A data storage device comprising indicia of a method for providing an output signal for stepper motor control, the method comprising:

in response to a first interrupt request of a first motor control mode, determining a first interval from the present time to a time when a next interrupt request for a second motor control mode is expected to occur;

comparing the first interval to a predetermined interval; and directing, in response to the comparison, the provision of a bilevel signal for a motor in response to an occurrence of a following interrupt request of the second motor control mode that follows the next interrupt request for the second motor control mode.

14. The data storage device of claim 13 wherein the first motor control mode accomplishes a substantially constant angular velocity of the motor and the second motor control mode accomplishes a varying angular velocity of the motor.

15. The data storage device of claim 13 wherein the first motor control mode accomplishes a varying angular velocity of the motor and the second motor control mode accomplishes a substantially constant angular velocity of the motor.

16. The data storage device of claim 15 wherein the method further comprises: during operation in the varying angular velocity motor control mode, receiving a plurality of interrupt requests at a first rate and providing a plurality of output signals for motor control at a second rate being an integer fraction of the first rate.

17. The data storage device of claim 15 wherein the method further comprises:

during operation in the varying angular velocity motor control mode, receiving a plurality of interrupt requests at a first rate;

providing a plurality of output signals for motor control at a plurality of respective second rates, each respective second rate being an integer fraction of the first rate provided in accordance with a respective divisor; and providing each respective divisor from a predetermined series.

18. The data storage device of claim 17 wherein providing each respective divisor comprises an algebraic calculation.

19. The data storage device of claim 17 wherein providing each respective divisor comprises recalling a value from an array.

20. The data storage device of claim 13 wherein the method further comprises:

enabling a first timer for providing the first interrupt request of the first motor control mode;

enabling a second timer for providing the next interrupt request and the following interrupt request; and after the step of directing, disabling the first timer.

* * * * *